United States Patent
Fiveash et al.

(10) Patent No.: US 6,789,200 B1
(45) Date of Patent: Sep. 7, 2004

(54) METHOD OF AUTOMATICALLY INSTITUTING SECURE, SAFE LIBRARIES AND FUNCTIONS WHEN EXPOSING A SYSTEM TO POTENTIAL SYSTEM ATTACKS

(75) Inventors: William Alton Fiveash, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/574,185

(22) Filed: May 18, 2000

(51) Int. Cl.[7] .............................. H04L 9/32; G06F 9/00
(52) U.S. Cl. ....................................... 713/200; 709/331
(58) Field of Search ........................... 713/200; 709/331

(56) References Cited

U.S. PATENT DOCUMENTS

| | | | |
|---|---|---|---|
| 5,434,562 A | * | 7/1995 | Reardon ..................... 713/200 |
| 5,479,612 A | * | 12/1995 | Kenton et al. .............. 713/200 |
| 5,819,091 A | * | 10/1998 | Arendt et al. ............... 709/331 |

* cited by examiner

*Primary Examiner*—Gregory Morse
*Assistant Examiner*—Jacob Lipman
(74) *Attorney, Agent, or Firm*—Duke W. Yee; Volei Emile; Wayne P. Bailey

(57) ABSTRACT

A method of protecting a data processing system is provided. In a preferred embodiment the data processing system temporarily switches from a main system library mode to a safe system library mode. A user then may open and read a document, such as, for example, an e-mail message, and any virus or worm contained in the document will be prevented from executing and damaging the data processing system.

27 Claims, 6 Drawing Sheets

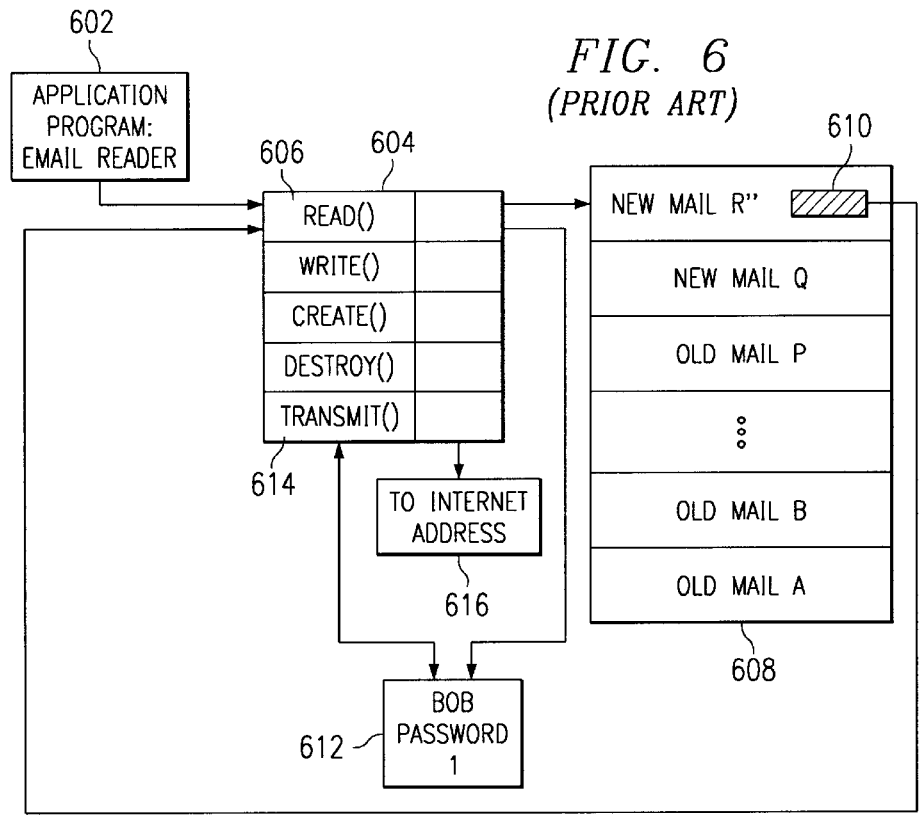
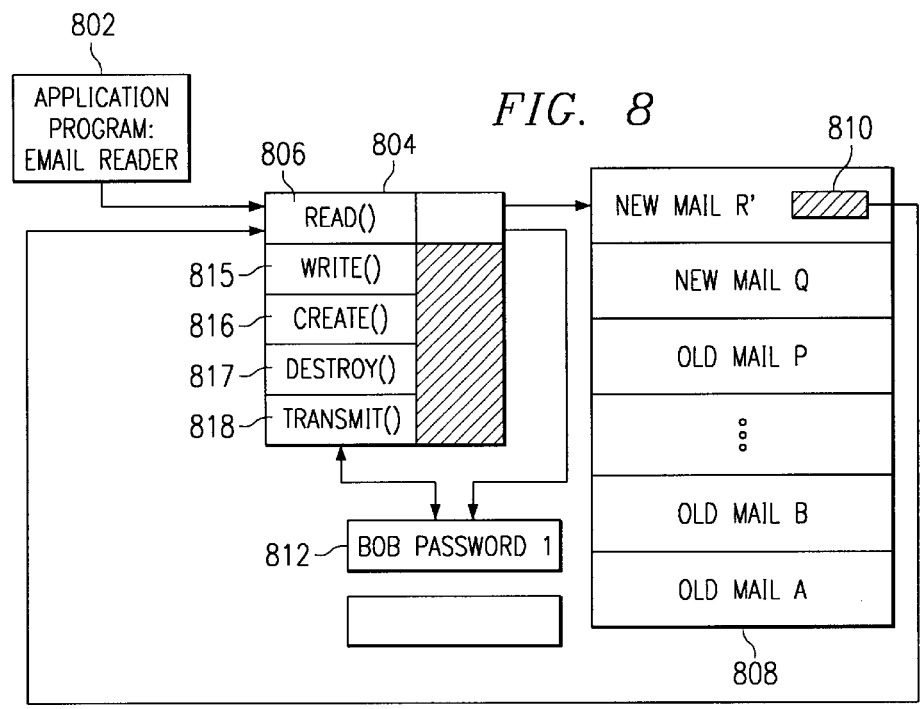

METHOD OF AUTOMATICALLY INSTITUTING SECURE, SAFE LIBRARIES AND FUNCTIONS WHEN EXPOSING A SYSTEM TO POTENTIAL SYSTEM ATTACKS

BACKGROUND OF THE INVENTION

1. Technical Field

The present invention relates to the field of computer software and, more particularly, to methods of protecting data processing systems from viruses and other outside system attacks.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of, both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). In offering goods and services, some companies offer goods and services solely on the Web while others use the Web to extend their reach.

Although this enormous increase in the popularity of the Web and also in electronic mail (e-mail) use has provided many desirable results, such as, the speed and breadth with which information is disseminated, it has also enabled many undesirable features. One of the most notable undesired results of the popularity of the Web and e-mail is the ease of transmission of computer viruses and worms. This is because, unlike before the advent of the Internet when users rarely read or copied data onto their computers from unknown external sources, users today routinely receive data from unknown computers via e-mail or via download from the web using a web browser.

A computer virus is a section of code that is buried or hidden in another program. Once the program is executed, the code is activated and attaches itself to other programs in the system. Infected programs in turn copy the code to other programs. The effect of such viruses can be simple pranks, causing a message to be displayed on the screen or more serious effects such as the destruction of programs and data.

Worms are destructive programs that replicate themselves throughout a hard disk and/or memory within a computer using up all available disk or memory space. This replication eventually causes the computer system to crash since, eventually, there is no available disk or memory space to store data.

Most currently available virus protection software focus on identifying and removing viruses from a system. The virus protection programs protect the computer by scanning e-mail and other files for know sections of a virus or worm. Whenever a file is identified as containing a known virus or worm, the user is alerted and the file can be removed or the virus within the file may be removed. Whenever a new virus is identified, new code is written to search for the identifiable features of the new virus. However, these software programs are ineffective against new viruses that have been created after the virus software program was created since the virus protection software will not know what the identifiable features of the new virus are and will thus not find it when it scans the files.

Furthermore, there are currently new types of viruses that frequently mutate making it very difficult for the virus protection programs to identify the presence of these viruses. Thus, even utilizing one of these programs can still leave a computer user's data processing system susceptible to these attacks. Therefore, it would be advantageous to have a method and apparatus to prevent these destructive programs from performing their destruction even when the particular nature of the virus, worm, or other destructive program cannot be identified beforehand.

SUMMARY OF THE INVENTION

The present invention provides a method of protecting an operating system from viruses and worms. Whenever a user requests to read an unauthenticated file such as a piece of electronic mail, rather than use the main system library, the system switches to an alternate library that prevents a virus or worm from performing its destructive function. In one embodiment, the alternate library contains only a read function, thus, if a virus or worm attempts to write to the computers hard drive, that attempt is unsuccessful. Therefore, the virus or worm cannot replicate itself, corrupt files, fill up the hard drive, or perform any of a number of other destructive functions.

Suppose, as an example, that a user requests to read an unauthenticated piece of electronic mail. Once the electronic mail program receives that request, rather than use the main system library, it switches to an alternate safe library that contains only a read function. If the electronic mail message contains a virus that attempts to overwrite a password file, thus corrupting the file and making it useless, such an attempt will be unsuccessful since the alternate library does not contain a write function that would enable the virus to write to the password file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a block diagram illustrating a breach of system security;

FIG. 8 depicts a block diagram illustrating an exemplary method of protecting the integrity of an operating system when reading an e-mail message in accordance with a preferred embodiment of the present invention.

DETAILED DESCRIPTION OF THE PREFERRED EMBODIMENT

Figure 1:
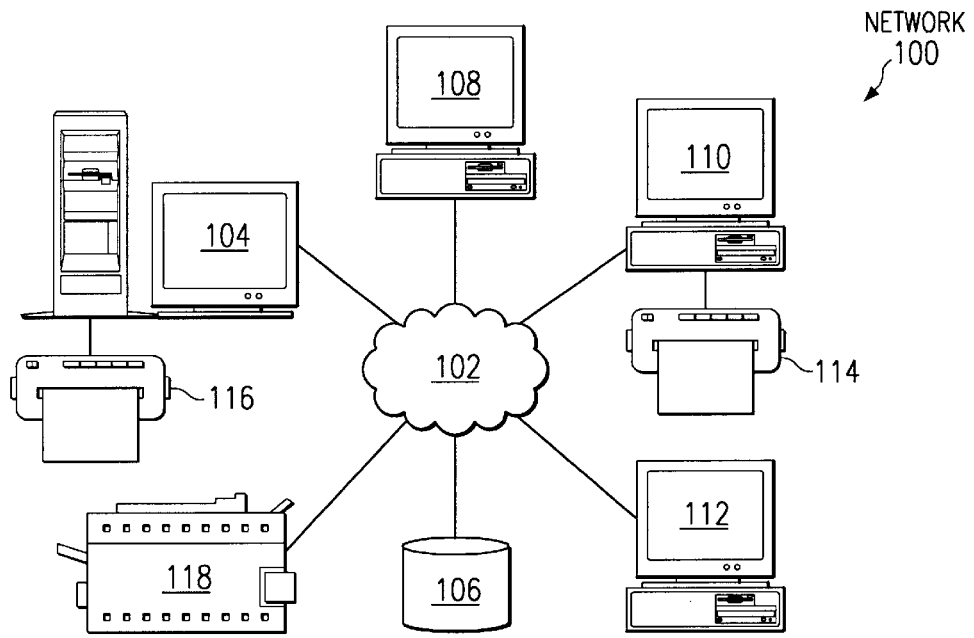
FIG. 1 depicts a pictorial representation of a distributed data processing system in which the present invention may be implemented.

The present invention provides a method and apparatus for reading and opening files, which may potentially contain viruses or worms, without damaging or compromising the computer operating system. This security is provided by use of a system "safety" mode. The "safety" mode is an alternate system library that is used instead of the normal system libraries. The system "safety" mode may be triggered by a user or automatically by the operating system so that during a set period of time, temporary system libraries are used to protect the operating system.

The following are a few examples of options that may be found in the safe version of the system library in accordance with the present invention. In one embodiment, the safe system library only contains a system open( )call. All other calls, such as the read( ) and write( ) calls, are omitted and return an error if there is an attempt to invoke them.

In another embodiment of the present invention, the alternate safe system library contains a read( ) and a write( ) function. However, in this embodiment the read( ) and write( ) functions will not actually read or write, but will return to the calling program a fake pointer and print out to a log file the files that were requested. Thus, for example, if a virus or worm is attempting to read the user's password file so that the password can be sent to a waiting machine on the Internet, the password data will not actually be sent, but the user can see that a virus or worm has attempted to read the password file since the password, requesting document name and time will be written to a log file.

In another embodiment of the present invention, the alternate safe system library contains the same functions as the main system library except that all write( ) calls go to a secure directory regardless of the directory requested. Thus, for example, if a user opened a file containing a virus and the virus attempts to write data into the user's password file, the password file will not be overwritten with useless data because the write( ) function will write the data into the secure directory instead of into the password file. Thus, the virus will not overwrite the password file.

In another embodiment of the present invention, the safe system library contains the same functions as the main system library and these functions perform in the same manner as in the main system library. However, all network communication functions are disabled. Disabling network communication functions inhibits a virus's attempts to send one of the user's files to an outside entity. Attempts to invoke network communication functions are not spooled for later execution. Thus, when network communication functions are later re-enabled, the virus's prior attempt at invoking network communications will not be executed.

Typically, the safe system libraries are permanently contained on the system just as are the main system libraries. There may in fact be many different versions of the safe system libraries available on the system. When the system safe mode is desired, a different version of the safe system libraries may be selected by the operating system depending on the activity in which a user is engaged and on the desires of the user. For example, if the user wishes to read an e-mail message, then the operating system may select a version of the safe system libraries in which the read ( ) function is enabled, but other functions are omitted or function differently than in normal operation.

Alternatively, the safe system libraries may be created by the operating system at the time that the safe operating mode is invoked. Just as in the above example, the appropriate version of the safe system libraries is selected depending on the activity in which the system is engaged, the operating system in this alternative case will construct a version of the safe system libraries suitable for the proposed activity.

One advantage of the present invention is that the call requesting use of the alternate safe system library can be made from any directory under any program. For example, programs such as telnet or file transfer protocol (ftp) may be modified so that this temporary secure mode is used whenever the program is being used.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108, 110 and 112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
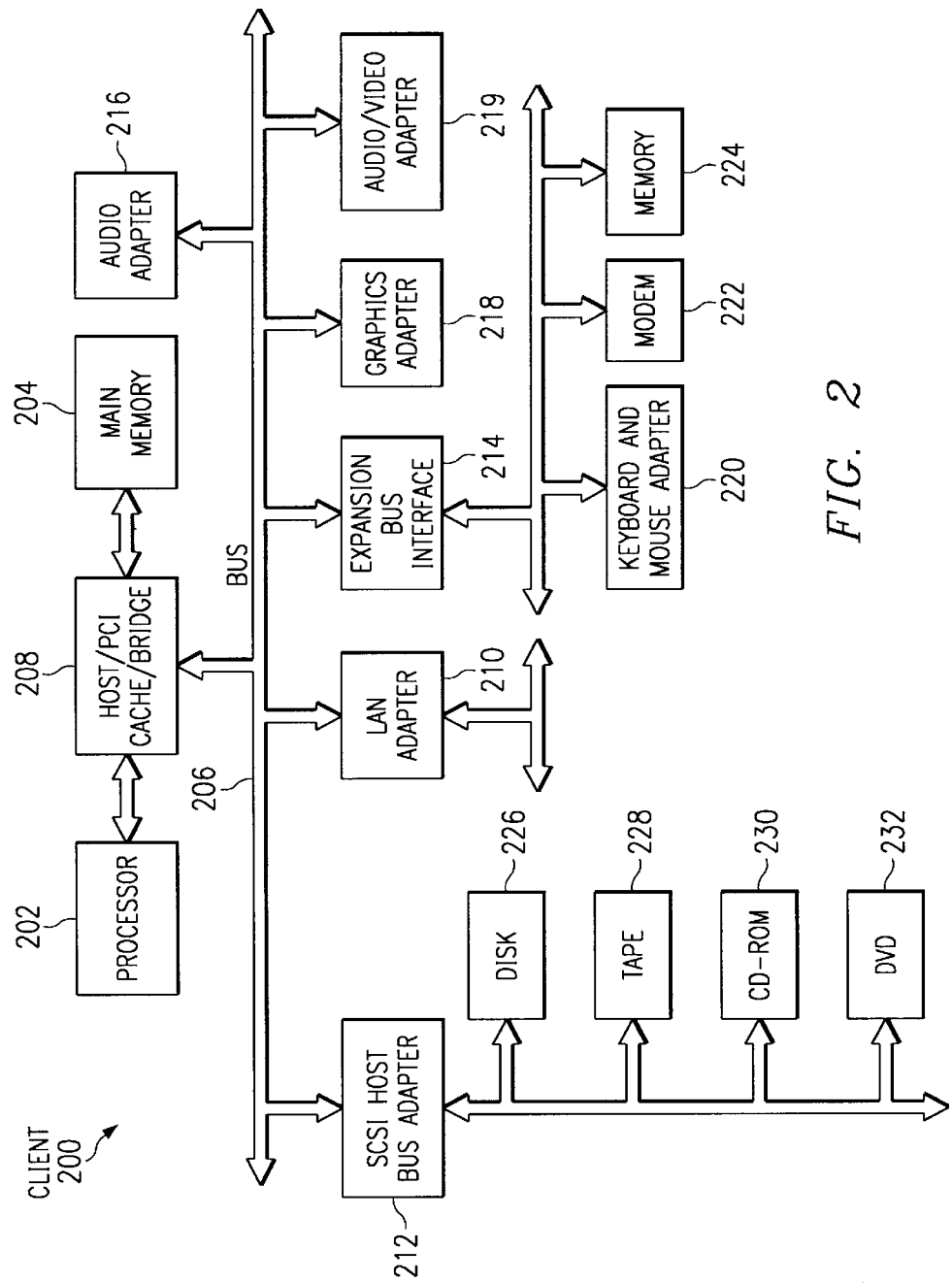
FIG. 2 depicts a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available system, such as an OS/2 operating system, which is available from International Business Machines Corporation. "OS/2" is a trademark of International Business Machines Corporation. An object oriented programming system, such as a Java operating system, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
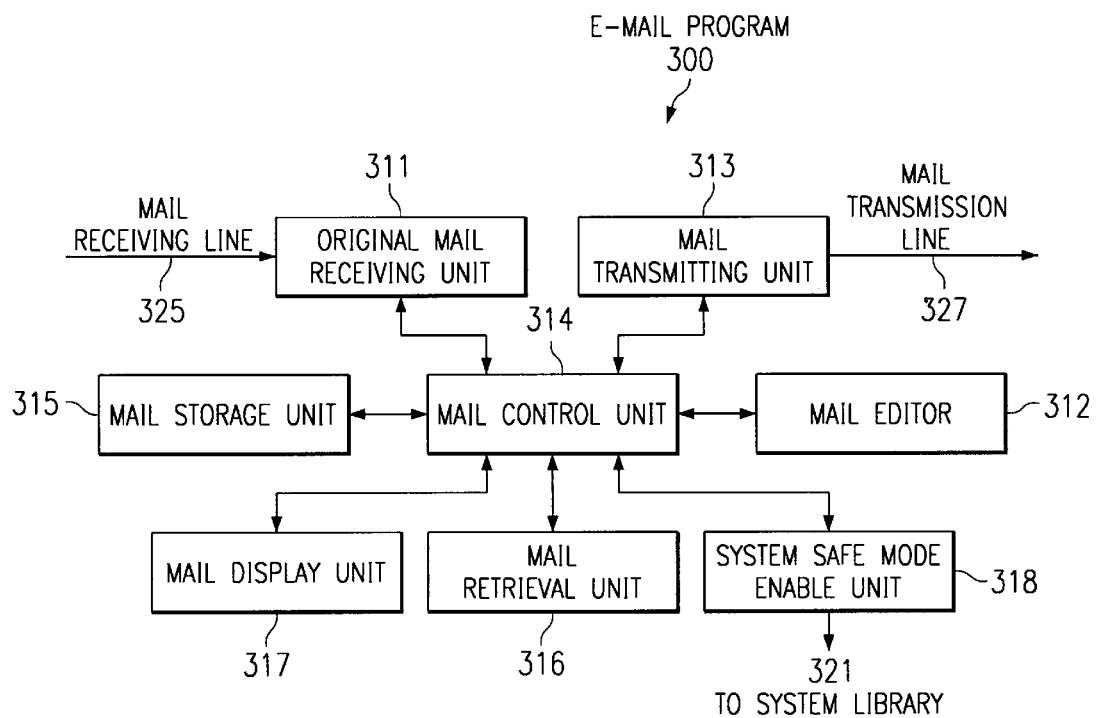
FIG. 3 depicts a block diagram of an electronic mail program in accordance with a preferred embodiment of the present invention.

Referring now to FIG. 3, a block diagram of an electronic mail program 300 is depicted in accordance with a preferred embodiment of the present invention. Electronic mail program 300 may be implemented in a data processing system such as data processing system 200 depicted in FIG. 2. Electronic mail program 300 includes a mail receiving unit 311, a mail transmitting unit 313, a mail control unit 314, a mail storage unit 315, a mail editor 312, a mail display unit 317, a mail retrieval unit 316, and a system safe mode enable unit 318.

The mail receiving unit 311 receives electronic mail transmitted over a mail receiving line 325 and stores it in the mail storage unit 315. The mail receiving line 325 may be, for example, a telephone line, a data transmission line, or a fiber optic cable. Alternatively, mail receiving line 325 may be replaced with a wireless receiving means such as a wireless modem. When a user wants to retrieve an electronic mail message, the mail retrieval unit 316 informs the mail control unit 314 that mail should be retrieved from the mail storage unit 315. The mail control unit 314 retrieves the electronic mail (e-mail) from mail storage unit 315 and sends the e-mail to a mail display unit 317. The mail display unit 317 displays the mail sent from the mail control unit 314 on a display device through an adapter, such as graphics adapter 218 in FIG. 2.

Mail editor 312 allows a user to compose and edit mail messages. When a user is ready to transmit a composed mail message, the mail editor 312 instructs mail control unit 314 to send the composed mail messages to the intended recipient. Mail editor 312 may be integral to e-mail program 300 or may be a word processing program called by e-mail program 300. Mail control unit 314 sends the composed mail message to mail transmitting unit 313 with instructions to send the mail to the intended recipient through mail transmission line 327, which also may be, for example, a telephone line, a data transmission line, or a fiber optic cable. Alternatively, mail transmission line 327 may be replaced with wireless transmission means such as a wireless modem.

System safe mode enable unit 318, in response to an instruction from mail control unit 314 that a new e-mail message is going to be opened, sends at message at 321 to the operating system instructing it to switch from the normal mode to a safe mode. The safe mode switches the active system library functions from the main system library to a safe system library thereby preventing a virus, worm or other destructive program from corrupting, deleting, creating, or transmitting files. The safe mode may be enabled any time an e-mail message is opened and read by a user or may be selectively employed at the request of the user.

Mail receiving line 325 and mail transmission line 327 are connected to an e-mail server, which may be implemented as server 104 as depicted in FIG. 1. E-mail program 300 is given merely as an example and is not meant to imply any architectural limitations. Other e-mail programs may include more or fewer units and may be implemented differently from that shown in FIG. 3.

Figure 4:
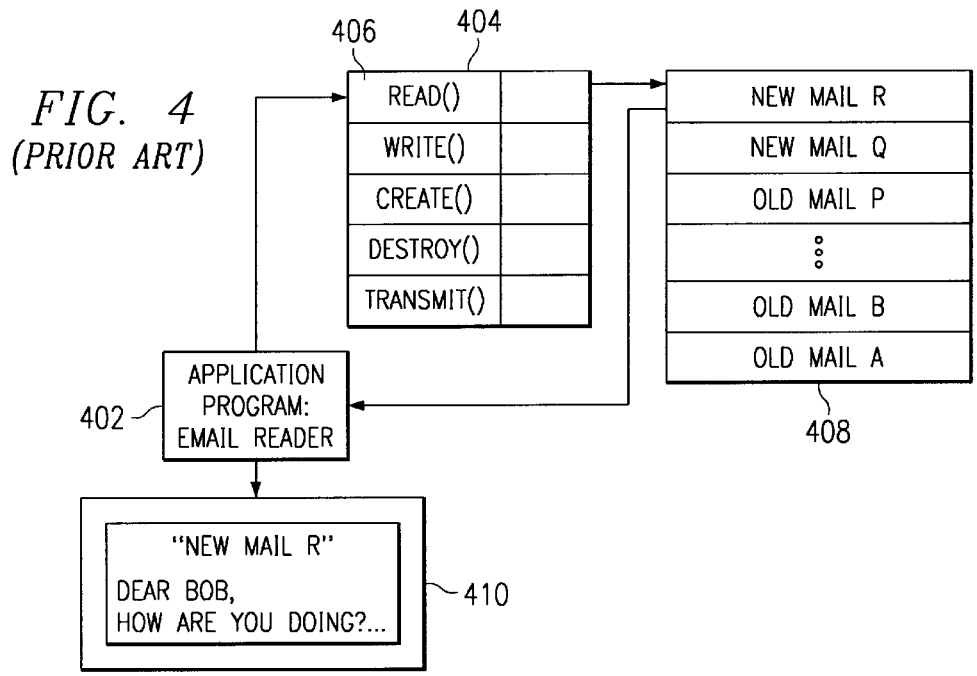
FIG. 4 depicts a block diagram illustrating a typical manner in which electronic mail is read by an application.

Referring now to FIG. 4, a block diagram illustrating a typical manner in which electronic mail is read by an application is depicted. A mail "spool" holds old mail A–P and new mail Q and R. Suppose, a user starts an e-mail reader 402 to read new mail message R. E-mail reader 402 will call read( ) system function 406 from operating system libraries 404 to read the new mail message R. The read ( ) system call 406 will then go to mail "spool" 408 and read the designated file, e.g., new mail message R. The information (i.e., mail text) will then be taken from mail spool 408 and will be sent to e-mail reader 402. E-mail reader 402 will format this data for a user to read and will send this to user display 410 where it will be displayed to a user to read. This manner of reading e-mail works fine normally. However, it has serious shortcomings when the e-mail message contains a computer virus or a worm. This is because the virus or worm has full access to all of the system libraries 404 and thus can create a file, corrupt or write to an existing file, delete a file, or send a file to another computer. Examples of two methods in which a virus can exploit a prior art e-mail system are provided below.

Figure 5:
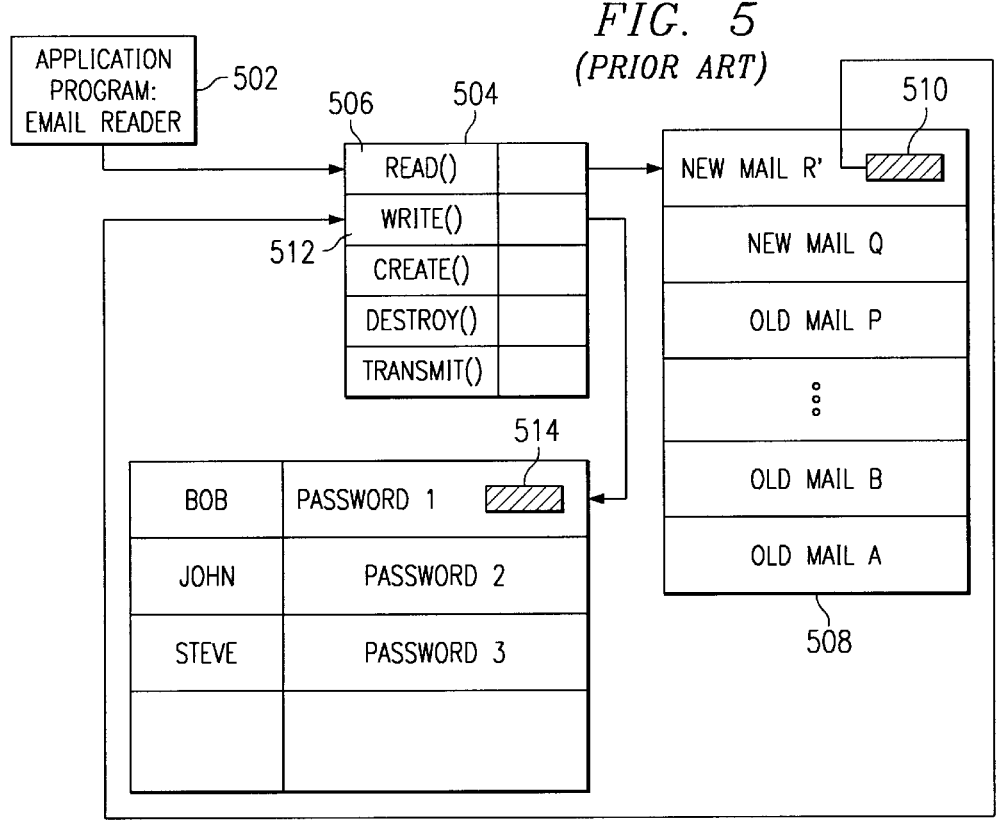
FIG. 5 depicts a block diagram illustrating the operation of a computer virus attached to an e-mail message in a traditional e-mail reading program.

Referring now to FIG. 5, a block diagram illustrating the operation of a computer virus attached to an e-mail message in a traditional e-mail reading program is depicted in which the virus is a virus that corrupts a file. Suppose a user starts e-mail reader 502 to read mail just as depicted in FIG. 4. Then, e-mail reader 502 will call read( ) function 506 from system libraries 504 to read the new mail from mail "spool" 508. The library read( ) function 506 will open the new mail file R'. However, suppose that, unlike the example in FIG. 4, the new mail file R' has an embedded virus 510 that is activated upon opening the file R'. Also, suppose that the virus 510 is a program which will first go to the system library 504 and use the write( ) system call 512 to open and corrupt a sensitive system file 514. If the sensitive system file 514 is Bob's password file, then the system password file 514 for user Bob will be corrupted by the write( ) library call 512 as directed by virus 510. Thus, when Bob enters his password, it will not work. Note that the sensitive system file 514 could be any of a number of files other than a system password file, such as, for example, a file necessary for the operating system to perform correctly.

Another example of how a virus embedded in an e-mail message can have malicious repercussions is shown in FIG. 6. Suppose a user starts e-mail reader 602 to read e-mail messages. E-mail reader 602 then calls library read( ) function 606 in system libraries 604 to read the new e-mail messages from mail spool 610. The library read( ) function 606 then opens the new mail file R". Suppose mail file R" has an embedded virus 610 that will be activated once the file is opened. (In this example, the virus program 610 is a binary program which calls the library read( ) function 606 to read the system password file 612). The read( ) function 606 will follow the virus's 610 instructions and read Bob's password. The virus program 610 then will take Bob's password data and will call the system library transmit( ) routine 614. Bob's password will then be transmitted to a waiting machine 616 on the Internet. In this case, the security of the system will have been compromised since Bob's password is now in the possession of an outsider.

Figure 7:
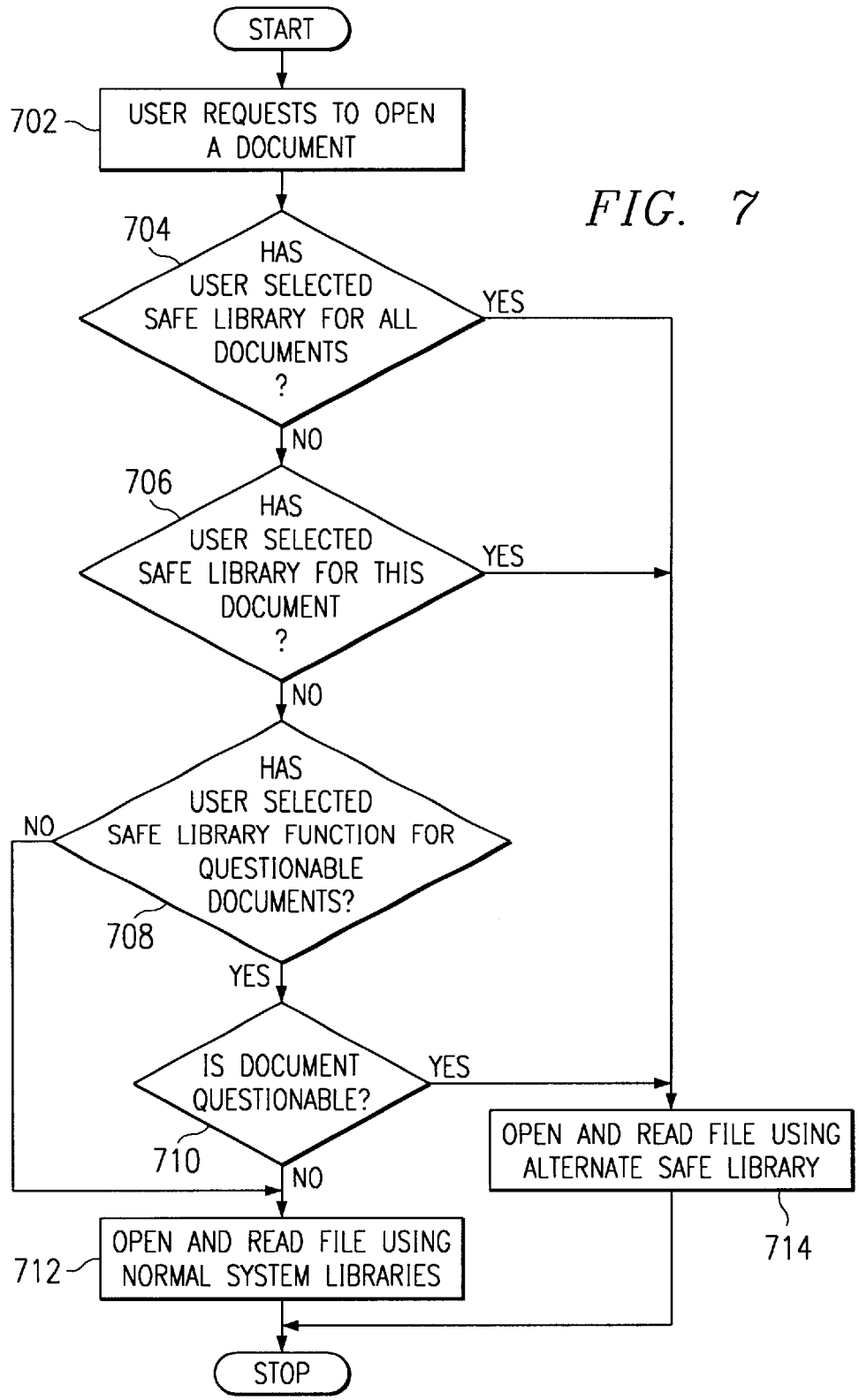
FIG. 7 depicts a flowchart illustrating an exemplary operation of a preferred embodiment of the present invention.

Referring now to FIG. 7, a flowchart illustrating an exemplary operation of a preferred embodiment of the present invention is depicted. To start, a user requests a document to be opened (step 702). This could be, for example, a request to read an e-mail message or to download and view a document from a web site. Once the request is received, the data processing system determines whether the user has selected the option of using the safe system library for opening and reading all documents (step 704). If this option has been selected, then the requested document is opened and read using the safe system library rather then the main system library (step 714). If the option has not been selected, then the data processing system determines whether the user has selected the use of the safe system library to open and read the requested document (step 706). If the option has been selected, then the requested document is opened and read utilizing the safe system library (step 714).

If the user has not selected the use of the safe system library for opening the requested document, then the data processing system determines whether the user has selected the option of using the safe system library for opening and reading documents of questionable character or content (step 708). A document may be considered questionable if, for example, the document originates from an address not contained in a list of safe addresses or the document originates from a web site that is not on a list of approved and safe web sites. If the user has not selected the option of using the safe system library for opening and reading documents of questionable character or content, then the document is opened and read using the normal system libraries (step 712).

If the user has selected the option of using the safe system library when opening or reading a questionable document, then the data processing system determines if the document is questionable (step 710). If the document is not questionable, then the document is opened and read using the normal system library (step 712). If the document is questionable, then the document is opened and read using the safe system library (step 714).

Referring now to FIG. 8, a block diagram illustrating an exemplary method of protecting the integrity of an operating system when reading an e-mail message is depicted in accordance with a preferred embodiment of the present invention. In this embodiment, the safe system library 804 allows a user to read a file using the read library function 806, but all other system library functions 815–818 are omitted and will return with an error. Suppose a user wants to read an e-mail message and opens e-mail reader 802 to read the message. Once the user has selected an e-mail message to read, the operating system will switch to the safe system library 804. The read( ) function 806 will open the new mail file R'.

Suppose new mail file R' has an embedded virus 810 that is activated upon opening the file R'. As before, suppose the virus program 810 will call the library read( ) function 806 to read the system password file 812. Once the e-mail message R' is opened, the virus will call the read( ) function 806, which will follow the virus's 810 instructions and read Bob's password. The virus program 810 will then take Bob's password data and call the system transmit( ) function 818. However, since in the safe system library 804, the transmit( ) function 818 is omitted, no data transmission will occur, thus preventing the virus 810 from e-mailing Bob's password to a waiting machine on the Internet. Similarly, if virus 810 had attempted to destroy a file, create a new file, or write to a file, those attempts would also have failed since the library functions 815–817 associated with those functions are also omitted in the safe system library 804 as described above.

Figure 9:
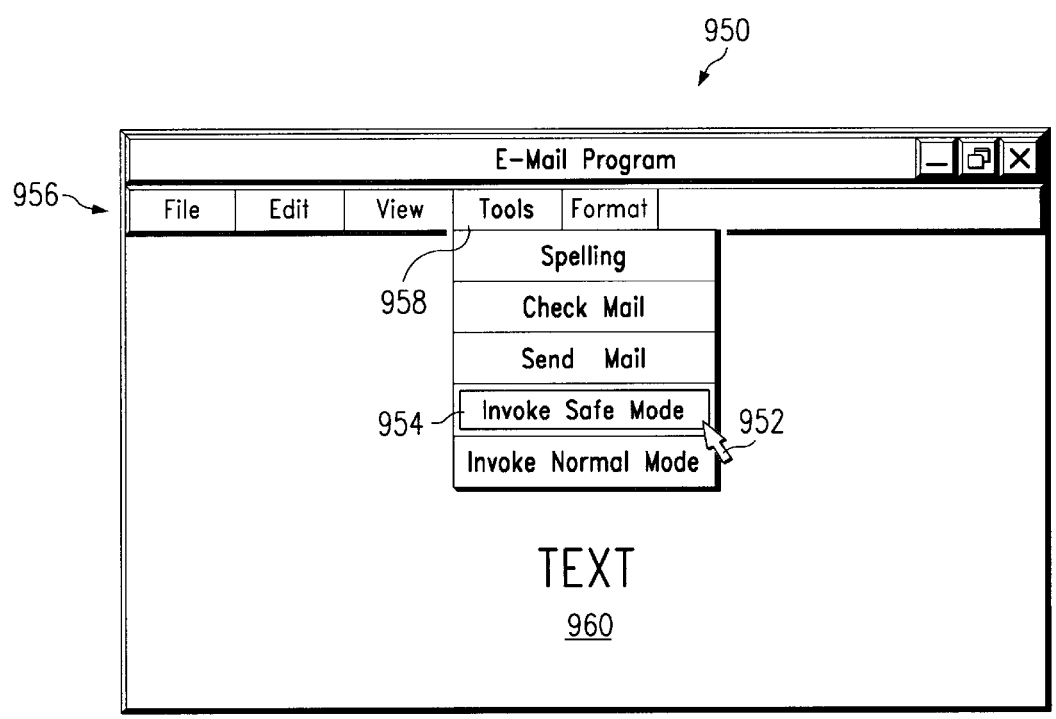
FIG. 9 depicts a pictorial diagram illustrating an exemplary user interface for invoking the safe mode to switch between the safe system libraries and the main system libraries in accordance with the present invention.

Referring now to FIG. 9, a pictorial diagram illustrating an exemplary user interface for invoking the safe mode to switch to the safe system libraries in accordance with the present invention. User interface 950 is an example of a screen displayed to a user when running an e-mail program. User interface 950 includes a text area 960 in which the text of e-mail messages and other documents and data may be displayed to a user. User interface 950 also includes a tool bar 756 which includes a number of pull down menus.

The tools pull down menu 958, which is one of the pull down options of tool bar 956, includes numerous functions that a user might wish to perform, such as, for example, options for checking spelling and for sending mail. Tools pull down menu 958 also includes a menu option 954 to invoke the safe mode of operation. The safe mode of operation switches from the main system libraries to a set of safe system libraries which prevent files from damaging the integrity of the data processing system in which the e-mail program executes. A user may select the safe mode by selecting menu option 954 using, for example, pointer 952, which may be moved by means of a mouse.

User interface 950 is merely an example of a user interface that may allow a user to select and deselect use of a set of safe system libraries to protect the integrity of the data processing system. However, other user interfaces may be used as well, such as a "pop up" menu. Furthermore, the selection of the safe system libraries may be made in conjunction with other types of application programs other than the e-mail program depicted in FIG. 9.

Although the present invention has been described primarily with reference to preventing destructive programs from compromising an operating system in the context of opening and reading e-mail with an e-mail program, it will be recognized that the present invention applies to other types of programs as well, including, but not limited to, web browsers. In the context of a web browser, the safe library mode could be enabled whenever a data file or other data is downloaded from an Internet site.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method of safe guarding a data processing system, comprising the steps of:
   receiving a document from a network;
   determining whether the received document, which has not been installed for execution on the data processing system, may impair the data processing system;
   if the received document may impair the data processing system, using an alternate library instead of a main system library of the data processing system.

2. The method as recited in claim 1, wherein the alternate library contains functions that will refrain from performing activities that will impair the integrity of the data processing system.

3. The method as recited in claim 1, wherein the alternate library contains only an open call function.

4. The method as recited in claim 1, wherein the alternate library contains only a read call function.

5. The method as recited in claim 1, wherein the alternate library contains only a write call function.

6. The method as recited in claim 1, wherein the alternate library comprises a write call function and, responsive to a request to write the contents of a document to a requested destination, the write call function writes the name of the requested document to a log file rather than to the requested destination and returns a fake pointer.

7. The method as recited in claim 1, wherein the alternate library comprises a read call function and, responsive to a request to read a document, the read call function writes the name of the requested document to a log file and returns a fake pointer.

8. The method as recited in claim 1, wherein the alternate library disables network communications.

9. The method as recited in claim 1, wherein the alternate library comprises a write call function and, responsive to a request to write a document to a particular directory, writing the requested document to a secure directory without writing the document to the particular directory.

10. A computer program product in computer readable media for use in a data processing system for safe guarding a data processing system, the computer program product comprising:
    first instructions for receiving a document from a network;
    second instructions for determining whether the received document, which has not been installed for execution on the data processing system, may impair the data processing system;
    third instructions for, if the received document may impair the data processing system, using an alternate library instead of a main system library of the data processing system.

11. The computer program product as recited in claim 10, wherein the alternate library contains functions that will refrain from performing activities that will impair the integrity of the data processing system.

12. The computer program product as recited in claim 10, wherein the alternate library contains only an open call function.

13. The computer program product as recited in claim 10, wherein the alternate library contains only a read call function.

14. The computer program product as recited in claim 10, wherein the alternate library contains only a write call function.

15. The computer program product as recited in claim 10, wherein the alternate library comprises a write call function and, responsive to a request to write the contents of a document to a requested destination, the write call function writes the name of the requested document to a log file rather than to the requested destination and returns a fake pointer.

16. The computer program product as recited in claim 10, wherein the alternate library comprises a read call function and, responsive to a request to read a document, the read call function writes the name of the requested document to a log file and returns a fake pointer.

17. The computer program product as recited in claim 10, wherein the alternate library disables network communications.

18. The computer program product as recited in claim 10, wherein the alternate library comprises a write call function and, responsive to a request to write a document to a particular directory, writing the requested document to a secure directory without writing the document to the particular directory.

19. A system for safe guarding a data processing system, comprising:

means for receiving a document from a network;

means for determining whether the received document, which has not been installed for execution on the data processing system, may impair the data processing system;

means for, if the received document may impair the data processing system, using an alternate library instead of a main system library of the data processing system.

20. The system as recited in claim 19, wherein the alternate library contains functions that will refrain from performing activities that will impair the integrity of the data processing system.

21. The system as recited in claim 19, wherein the alternate library contains only an open call function.

22. The system as recited in claim 19, wherein the alternate library contains only a read call function.

23. The system as recited in claim 19, wherein the alternate library contains only a write call function.

24. The system as recited in claim 19, wherein the alternate library comprises a write call function and, responsive to a request to write the contents of a document to a requested destination, the write call function writes the name of the requested document to a log file rather than to the requested destination and returns a fake pointer.

25. The system as recited in claim 19, wherein the alternate library comprises a read call function and, responsive to a request to read a document, the read call function writes the name of the requested document to a log file and returns a fake pointer.

26. The system as recited in claim 19, wherein the alternate library disables network communications.

27. The system as recited in claim 19, wherein the alternate library comprises a write call function and, responsive to a request to write a document to a particular directory, writing the requested document to a secure directory without writing the document to the particular directory.

* * * * *

UNITED STATES PATENT AND TRADEMARK OFFICE
CERTIFICATE OF CORRECTION

PATENT NO. : 6,789,200 B1  Page 1 of 1
APPLICATION NO. : 09/574185
DATED : September 7, 2004
INVENTOR(S) : Fiveash et al.

It is certified that error appears in the above-identified patent and that said Letters Patent is hereby corrected as shown below:

On Title Page, Item (74) Attorney, Agent, or Firm: delete "Volei Emile" and insert --Volel Emile--.

Col. 1, line 24: after "source of" delete ",".

Signed and Sealed this

Twenty-seventh Day of March, 2007

JON W. DUDAS
*Director of the United States Patent and Trademark Office*